United States Patent [19]

Castleman

[11] 4,046,970
[45] Sept. 6, 1977

[54] RINGING DETECTOR FOR TELEPHONE CIRCUITS

[75] Inventor: Cordell V. Castleman, Bloomington, Minn.

[73] Assignee: Magnetic Controls Company, Minneapolis, Minn.

[21] Appl. No.: 675,949

[22] Filed: Apr. 12, 1976

[51] Int. Cl.² .......................................... H04M 1/26
[52] U.S. Cl. ................................................ 179/84 L
[58] Field of Search ............... 179/84 R, 84 L, 81 C, 179/99, 84 A

[56] References Cited

U.S. PATENT DOCUMENTS 3,688,038  8/1972  Hugyecz .................... 179/84 R
3,909,554  9/1975  Reed ............................. 179/99

Primary Examiner—Kathleen H. Claffy
Assistant Examiner—Joseph A. Popek
Attorney, Agent, or Firm—Neil B. Schulte

[57] ABSTRACT

A circuit for detecting ringing signals on a telephone line in which the alternating voltage oscillations are converted to direct current pulses which are used to charge a first capacitor. Only signals of 14 hertz or above are sufficient to repetitively charge the first capacitor to a high enough voltage to open continuously a grounding circuit through a comparator, thus, allowing a second capacitor to charge up and open a second grounding circuit thus permitting current to flow to a suitable output. The output is used to activate lights on the telephone which lights are either flashed or winked by a unique resistance balanced solid state flash or wink generator.

3 Claims, 2 Drawing Figures

RINGING DETECTOR FOR TELEPHONE CIRCUITS

BACKGROUND OF THE INVENTION

In the prior art some types of telephone service, especially keyset, substitute flashing lights for the more conventional ringing bell. To do this it is necessary to have a circuit which can detect the ringing signal and operate a suitable common audible output and the flashing lights. In the past, resonant electronic circuits have been used to detect the ringing signal which can range from 16 to 60 hertz. However, such resonant circuits are slow to respond if they are made selective enough to reject being triggered by the 10 or 12 hertz pulses that are produced by dialing. To avoid this problem prior art telephone equipment is designed to disable the ringing detector circuits during dialing. My invention provides a solid state ringing detector which overcomes these disadvangtages by being at the same time both responsive and highly descriminatory. The circuit described herein can respond to the ringing signal in as little as two cycles but remain unaffected by the dialing signals so that it is no longer necessary to disable the ringing detector during dialing. Also my invention is less costly to build and adjust than a resonant circuit.

SUMMARY OF THE INVENTION

Briefly, the present invention converts the ringing signals to a series of DC pulses of a consistent size and shape. These pulses are used to charge a capacitor which capacitor in turn controls a comparator. Signals of 13 hertz or below, such as associated with dialing, are not sufficient to charge the capacitor to the point where the comparator circuit is opened and kept open until the next pulse arrives. However, signals of 14 hertz or above, corresponding to ringing signals, do charge the capacitor sufficiently to maintain the comparator open. When this happens a second capacitor is no longer grounded and is allowed to charge up to the point where an output is produced to operate the common audible signal and the flashing lights.

The lights flash normally in response to a ringing signal, come on steady when the phone is picked up, and wink if a hold button is pushed. The timing for the flash and wink sequence is provided by a solid state generator which is resistance balanced to minimize DC bias inaccuracies and thus provide highly accurate timing. The accurate timing permits both the flash and wink signals to be coordinated in a single circuit and thus reduces the complexity significantly.

It may therefore be seen that it is an object of my invention to provide an improved ringing detector and flash and wink generator which is both rapid and discriminatory while at the same time permitting a reduction in expense through the use of simplified circuits with fewer discrete components. Further objects and advantages will become apparent from the following detailed description and drawings.

DESCRIPTION OF THE PREFERRED EMBODIMENT

Figure 1:
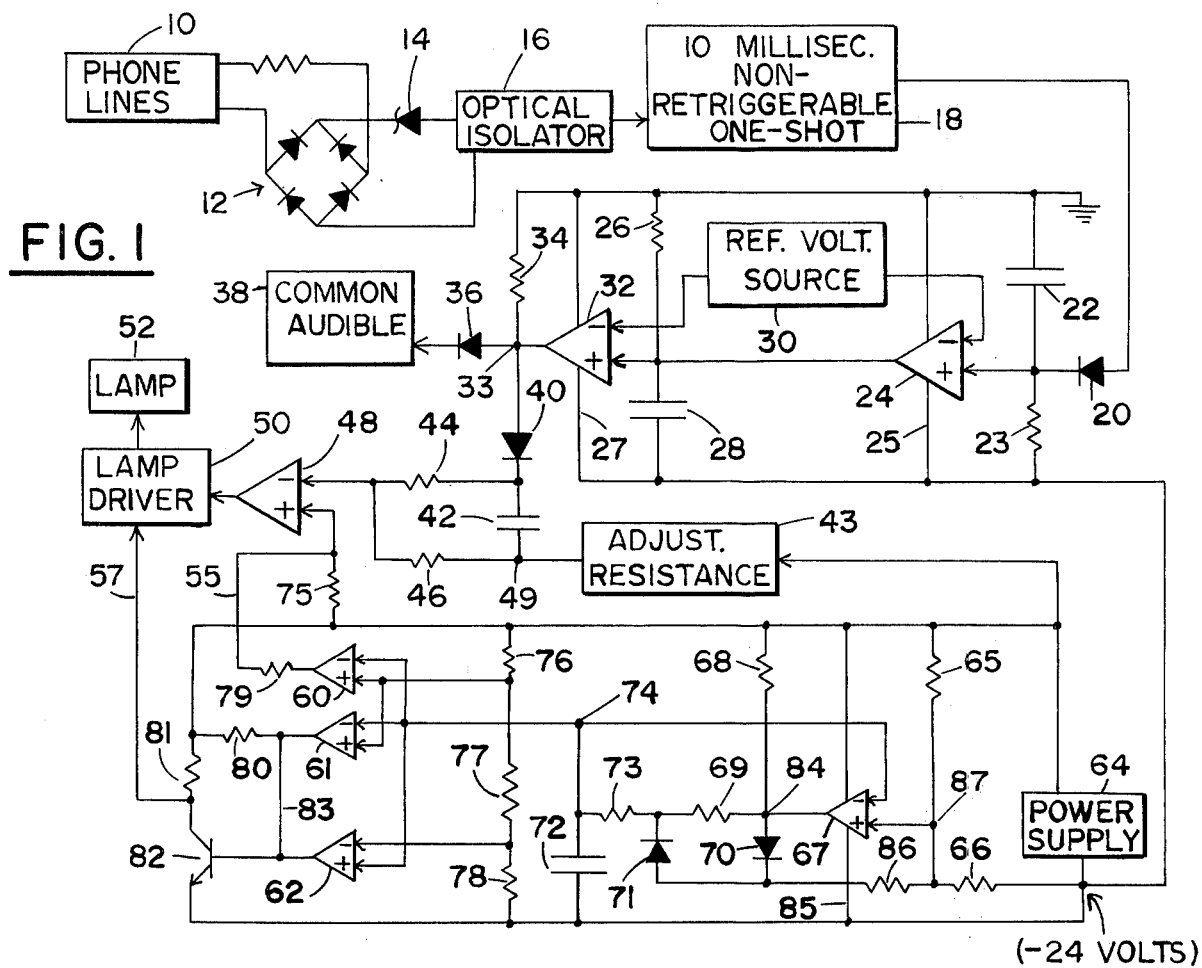
FIG. 1 shows a schematic diagram of the ringing detector and the flash and wink generator of the present invention.

Referring to FIG. 1, the phone lines 10 are connected through a rectifier 12 to an optical isolator 16. A Zener diode 14 blocks the DC voltage normally found on the phone lines. Optical isolator 16 protects the circuit from the noisy environment associated with telephone lines which may have random signals of low magnitude in the ringing signal range, namely, 16 to 60 hertz. The actual ringing signal, which is approximately 105 volts, passes through to operate a 10 millisecond non-retrigerable one-shot 18 which produces a series of square wave DC pulses at the ringing frequency. This series of pulses passes through a diode 20 to charge a capacitor 22. The charge on capacitor 22, however, immediately drains off through resistor 23. If the incoming pulses from one-shot 18 arrive at a rate of 14 hertz or above, they charge capacitor 22 faster than the charge can be drained off so that the input to comparator 24 becomes more positive than that from reference voltage source 30 and continues to remain more positive until the next pulse arrives. This causes comparator 24 to open the circuit from capacitor 28 through line 25 which otherwise discharges capacitor 28. It has been found that comparator 24 will remain open on the second and succeeding pulses from one-shot 18 which is much faster than the response time of a comparable resonant circuit. When it opens, it allows capacitor 28 to charge and raise the input voltage to comparator 32. Thus, comparator 32 is also caused to open the discharge circuit through line 27. The resulting more positive voltage at point 33 is directed through diode 36 to operate a common audible 38 and through a diode 40 to operate the flashing lamps on the telephone sets. p Since the ringing signal is present only for a second or two, and returns every four or five seconds, the signal is used to charge up a capacitor 42 which capacitor then operates the lamp driver 50 through a comparator acting as an AND gate 48. When the ringing signal terminates capacitor 42 continues to supply current through resistor 44 to gate 48 to hold the lamp driver on for about 5 seconds until the next ringing signal is received. The actual time period may be adjusted by adjusting the ground reference voltage presented to point 49 through an adjustable resistance 43.

Lamp driver 50 is operated in a flashing mode by a flashing signal presented on line 55 to the other input of gate 48. Lamp driver 50 is also operated by a wink signal received on line 57. The production of the flash and wink signals is accomplished as described below.

Figure 2:
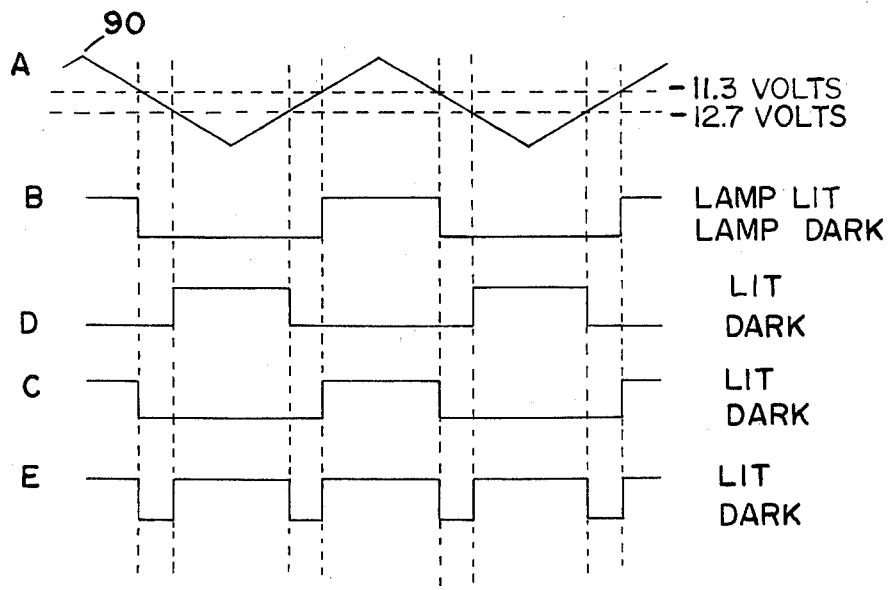
FIG. 2 shows the waveforms produced by the flash and wink generator.

A power supply 64 drives an analog comparator 67 with an open collector output transistor. Comparator 67 produces the waveform A shown in FIG. 2 at point 74 in FIG. 1. If, for example, the voltage is at its highest level indicated by point 90 in FIG. 2 this is coupled back from point 74 to the input of comparator 67. This makes the input from point 74 more positive than the input from the bridge formed by resistor 66 and resistor 65 in parallel with resistor 86, diode 70, and resistor 68 causing comparator 67 to ground out point 84 to the −24 volt line through line 85. The voltage at point 74 begins to lower as current flows through resistors 73 and 69. A new lower input voltage to comparator 67 is established at point 87 by the flow of current through resistor 86, diode 71, and resistor 69 to point 84. This keeps capacitor 72 discharging until such time as capacitor 72 has discharged far enough to reach a point lower than the input from point 87. At that time, the comparator 67 opens its circuit through line 85 and capacitor 72 once again begins to charge up through resistors 68, 69, and 73. The voltage at point 84 becomes more positive and is coupled through diode 70 and resistor 86 to the input of comparator 67 so point 87 also becomes more positive, thus, maintaining the charging condition until capacitor 72 charges up sufficiently that the input to comparator 67 therefrom once again becomes more positive than the input from point 87. Comparator 67 again closes and connects point 84 through line 85 to the −24 volts. Diodes 70 and 71 and resistor 69 permit the circuit to be designed such that equivalent resistances are encountered whether capacitor 72 is being charged or discharged. Reference to the table of preferred embodiment values at the end of the text will show these balanced resistances. Accordingly, a very symmetric waveform A is produced, as shown in FIG. 2. Waveform A can be used to produce both the flash signal and the wink signal in a synchronous fashion.

The triangular wave A at point 74 is presented to a comparator 60 which receives a reference voltage from the bridge formed by resistors 76, 77, and 78. Whenever the voltage from the triangular waveform is above −11.3 volts comparator 60 turns on to produce the waveform B shown in FIG. 2. This signal is coupled through gate 48 to operate lamp driver 50 and flash lamp 52.

In a similar fashion the triangular waveform A is presented to a comparator 61 which receives the same reference voltage as comparator 60 and produces waveform C. The output of comparator 61 is the same as that of comparator 60 and is connected to control a transistor 82 which in turn operates the lamp driver 50. For those times during which the lamp is dark for extended periods, as a result of the output of comparator 61, a third comparator 62 is connected to a different reference voltage derived between resistors 77 and 78 so as to turn on when the voltage drops below −12.7 volts. This is shown by the waveform D in FIG. 2. The output from comparator 62 is also used to drive transistor 82 so that the output of transistor 82 represents the combined output of both comparators 61 and 62 as shown by waveform E in FIG. 2. Thus, the wink signal represents a condition wherein the lamp is on for most of the time except for short wink intervals. It should be noticed that the flash signal drives the lamp driver simultaneously with the wink signal. Since the signals intermesh perfectly there is no conflict. This is made possible by the highly accurate timing created by the triangular waveform which in turn is made possible by the circuits around comparator 67 which use balanced resistances to provide accurate charging and discharging intervals for capacitor 72. The following table shows values that may be used for the electronic components in the preferred embodiment.

Resistors

23 — 931K
26 — 220K
34 — 10K
44 — 100K
46 — 1.5 Meg
65 — 100K
66 — 100K
68 — 22K
69 — 22K
73 — 680K
75 — 13.3K
76 — 100K
77 — 12K
78 — 100K
79 — 10K
80 — 22K
81 — 12K
86 — 100K

Capacitors

22 — 0.1Micro Farad
28 — 1 Micro Farad
42 — 4.7 Micro Farad
72 — 1 Micro Farad

I claim:
1. A ringing detector circuit for use in telephone systems comprising:
receiving means adapted to connect to the phone lines and operable to convert the alternating current ringing signal from the lines to a series of direct current pulses;
first charge storing means connected to receive the pulses from the receiving means and further connected to discharge through a predetermind resistance at a comparatively slow rate, so as to require a sufficiently high frequency of pulses in order to maintain a first selected voltage;
second charge storing means connected to a source of voltage so as to be charged thereby;
first switching means connected to said first and second storing means and operable to discharge the second charge storing means when in a first condition and to not discharge said second storing means when in a second condition, said first switching means operable to switch from said first condition to said second condition in response to the reception of said first selected voltage stored by said first storing means; and
second switching means connected to said second storing means and to an indicating means, the second switching means operable to activate the indicating means in response to the reception of a second selected voltage stored in said second storing means.

2. The apparatus of claim 1 in which said indicating means comprise a common audible signal and light flashing means.

3. The apparatus of claim 2 in which said flashing means comprises a triangular waveform generator with balanced resistance charge and discharge paths so as to produce a symmetrical waveform; and
comparator means connected to said generator to receive the waveform therefrom and turn on periodically when the voltages in the waveform exceed predetermined values so as to operate lights periodically.

* * * * *